Sept. 29, 1953
J. LOVE
2,653,842
TOGGLE FASTENER
Filed Oct. 9, 1951
2 Sheets-Sheet 1
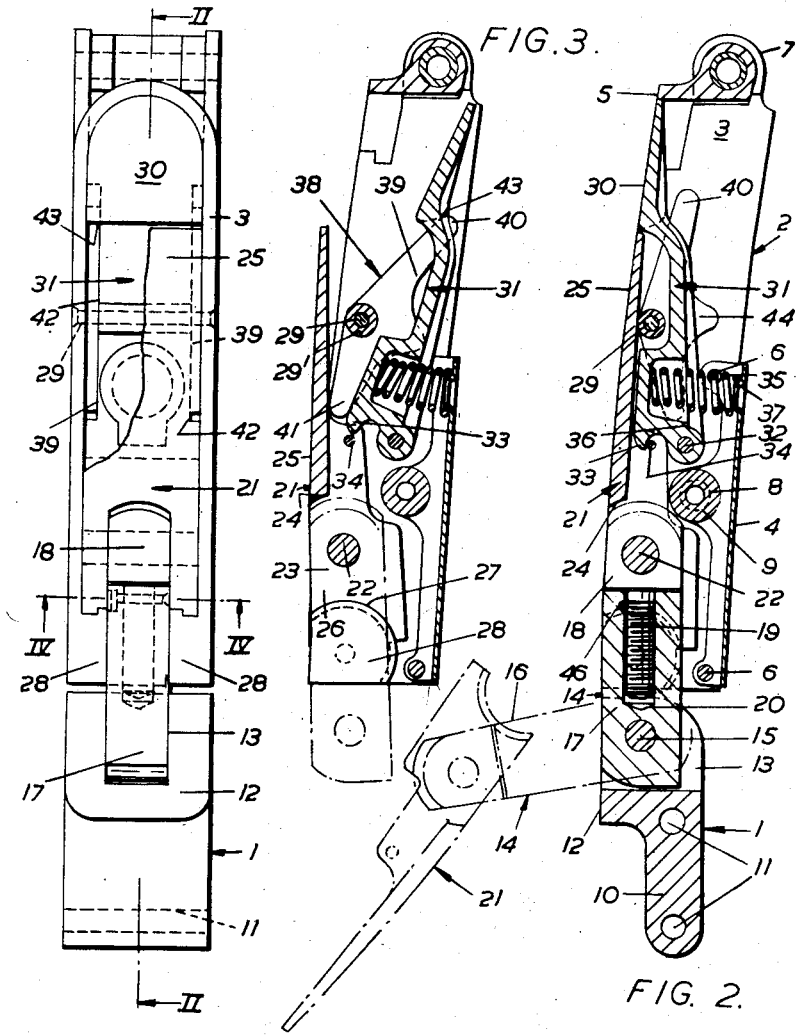
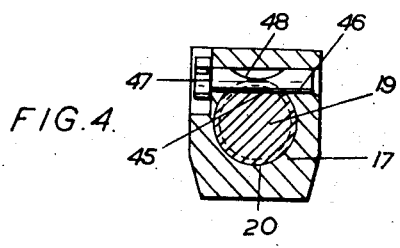
Inventor
JOHN LOVE
By Lucke + Lucke
Attorney Sept. 29, 1953  J. LOVE  2,653,842
TOGGLE FASTENER
Filed Oct. 9, 1951  2 Sheets-Sheet 2
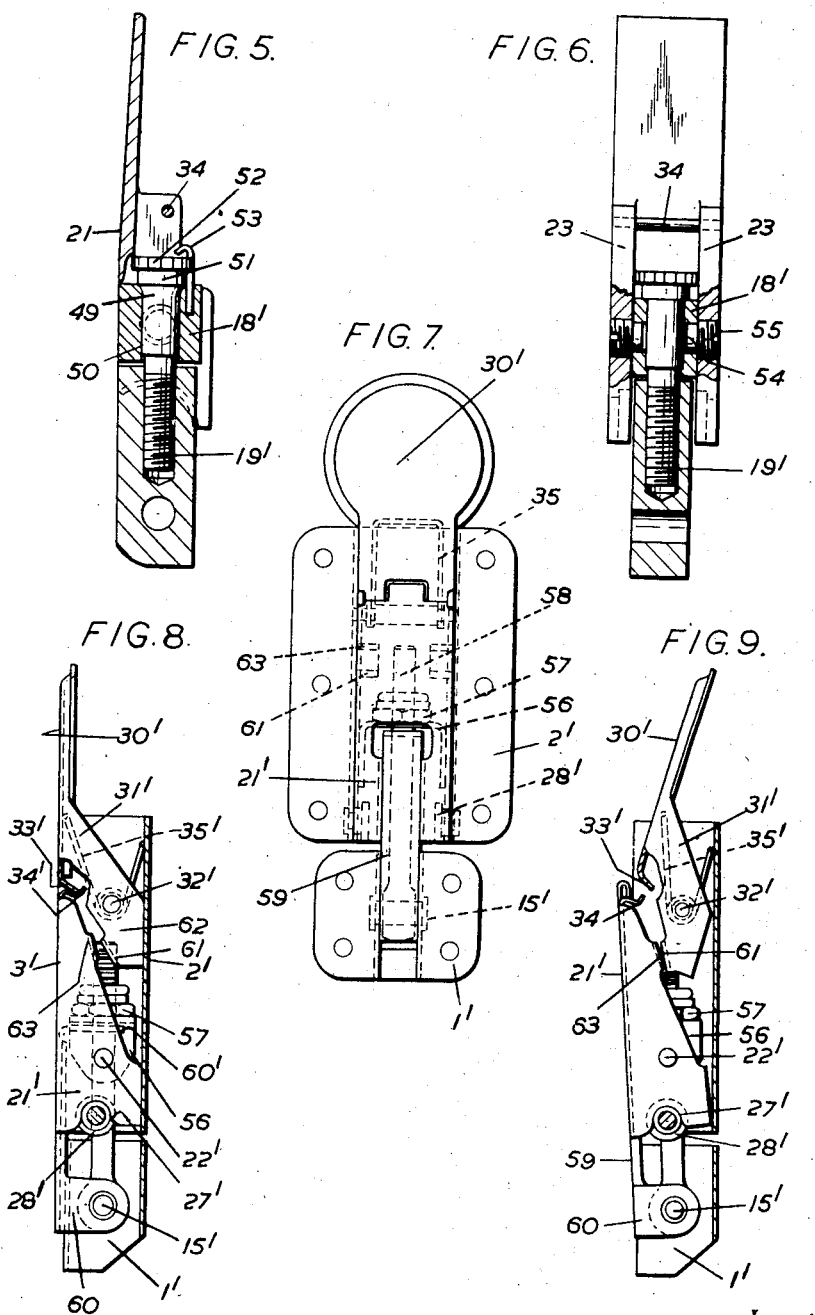
Inventor
JOHN LOVE
By Luck & Luck
Attorney Patented Sept. 29, 1953

2,653,842

UNITED STATES PATENT OFFICE 2,653,842

TOGGLE FASTENER

John Love, Hillington, Glasgow, Scotland, assignor to K. A. C. Limited, Hillington, Glasgow, Scotland, a British company Application October 9, 1951, Serial No. 250,540
In Great Britain October 11, 1950

17 Claims. (Cl. 292—256)

This invention concerns improvements in or relating to a toggle fastener for releasably securing together two members (e. g. two parts of an aircraft engine or other cowling, a removable panel and its supporting structure, fairings and the like) which are, when released, relatively movable, e. g. movable away from one another.

More particularly, the invention concerns improvements in or modifications of the toggle fastener described and claimed in the co-pending patent application of Thomas G. Llewhellin, Serial No. 96,512, filed June 1, 1949, now Patent No. 2,613,974. This patent application described, inter alia, a toggle fastener comprising a primary part and a secondary part adapted to be mounted respectively on each of two relatively separable members, said primary part comprising a bracket and said secondary part comprising a recessed housing; a two-part link pivoted at one end to said bracket, the parts of said link being axially adjustable to vary the length of the link; a locking lever, pivoted between its ends to the free end of said link, and comprising fulcrum means at one of its ends and a finger piece at its other end; a fulcrum member within and at each side of said housing adapted to be engaged by said fulcrum means on the said locking lever for partial rotation of the locking lever therearound to bring the latter into a locking position wherein its front surface lies flush with the front surface of said secondary part and closes part of the recess in said housing and wherein the pivot of the link with the locking lever is positioned to the rear of the plane containing the said fulcrum means and the pivot of the link with said bracket; a latch lever pivoted to said secondary part within the recess of said housing; a finger piece on said latch lever closing that part of the recess in said housing not closed by the locking lever in the locking position thereof; a latch on said latch lever adapted to engage said locking lever when in its said locking position; a spring positioned in said housing and co-operating with said latch lever to urge the latch thereon into its locking lever-engaging position, depression of the finger piece of the latch lever against the influence of said spring serving to disengage said latch from said locking lever and to give digital access to the finger piece of the latter. The primary and secondary parts of such a fastener are, in use, preferably arranged so as to lie with their outer surfaces flush with or behind the outer surfaces of the separable members which they connect and a transverse stop in is provided in the housing recess of the said secondary part of the fastener to limit the movement of the finger piece of the locking lever inwardly of said recess and the movement of the finger piece of the latch lever outwardly of said recess.

As the finger piece of the locking lever and the finger piece of the latch lever are, when the fastener is closed or locked, flush with one another and with the outer edges of the said secondary part or housing in which the latch lever is located, on releasing the fastener it is necessary first to release the latch lever by pushing its finger piece inwardly against the spring pressure and then to introduce a finger into the said housing and under the finger piece of the locking lever and thereafter to pull the locking lever forwardly; it has been found that it can in some circumstances, e. g. in cold weather or in the dark, be rather troublesome to withdraw the locking lever after its release by the latch lever, and to facilitate this operation is a primary object of this invention.

According to this invention there is provided a toggle fastener comprising a primary part and a secondary part formed respectively for attachment to two relatively separable members to be connected by the fastener; a locking lever having, at one end, a finger piece and, at its other end, fulcrum means; a link pivoted at one end between the ends of said locking lever and pivoted at its other end to said primary part of the fastener; fulcrum members on said secondary part of the fastener for engagement with the fulcrum means of said locking lever during the closing of the fastener; a latch lever pivotally carried by said secondary part of the fastener and adapted releasably to secure said locking lever in its locked position; and throw-out means operable by said latch lever, during the locking lever-releasing movement of the latter, to effect an initial movement of the locking lever in an unlocking direction.

The said throw-out element for effecting the initial unlocking displacement of the finger piece of the said locking lever may comprise a rocking element carried by the secondary part of the fastener and adapted to be actuated by the releasing movement of the latch lever and, as a result of this actuation, to cause (e. g. by direct operation thereon) the finger piece of the locking lever to be displaced forwardly or outwardly.

Alternatively the said throw-out element may be incorporated in the latch lever itself; thus it may form an integral extension of the latch lever disposed on the opposite side of the pivot of the latter to the finger piece of the latch lever and so disposed with respect to the latching part of this lever that, on operating the latch lever to release the latch lever, the release of the latter lever is effected before the throw-out element operates on the locking lever.

Further features and objects of the invention will become apparent from the appended description of certain embodiments of the invention illustrated in the accompanying drawings, and from the appended claims.

In the drawings:

Figure 1 is a front elevation of a toggle fastener constructed according to this invention, the fastener being shown in its closed or locked condition;

Figure 2 is a longitudinal section on line II—II, Figure 1;

Figure 3 is a section of the upper part of the fastener shown in Figures 1 and 2 but illustrates the parts of the fastener in the positions they occupy after the actuation of the latch lever to release and project the finger piece of the locking lever;

Figure 4 is a horizontal section on line IV—IV, Figure 1;

Figure 5 is a longitudinal sectional elevation of the locking lever of the fastener and a modified form of link for such lever;

Figure 6 is a part-sectional front elevation of the parts shown in Figure 5;

Figure 7 is a front elevation of a modified form of toggle fastener constructed according to this invention;

Figure 8 is a part side and part longitudinal section of the fastener shown in Figure 7 showing the fastener in its locked position; and Figure 9 is a view similar to Figure 8 but illustrates the fastener after release of the locking lever.

Referring to Figs. 1, 2, 3 and 4 of the drawings it will be seen that the toggle fastener there illustrated comprises a primary part generally indicated by the reference 1 and a secondary part generally indicated by the reference 2, these two parts of the fastener being adapted to be secured respectively in adjacent edges of two relatively separable members, e. g. two edge-to-edge cowling parts which are to be secured together by the fastener.

The secondary part 2 of the fastener comprises an elongated inverted U-shaped metal frame 3 partially closed at the rear portion of its lower end by a sheet metal back plate 4, the whole constituting a hollow or recessed housing which is adapted to be set into the movable part which is to carry the secondary part of the fastener in such a way that the front surface 5 of the frame 3 is flush with the outer surface of this part.

The back plate 4 is secured in the rear of the frame 3 by cross rivets 6 passing through lugs on forwardly extending edge flanges on the plate and into the sides of the frame 3.

To secure the secondary part in the required position bolts or the like are passed respectively through a lug 7 at the upper end of the frame 3 and through holes 8 in the sides of this frame, a spacing sleeve 9 being provided within the frame 3 co-axial with the holes 8.

The primary part 1 of the fastener comprises a bracket 10 furnished with transverse holes 11 through which may be passed bolts, rivets or the like for securing the bracket in the part by which it is to be carried, and the bracket is set in the said part in alignment with the secondary part 2 of the fastener and with its front surface 12 flush with the surface of the said part.

At its upper end the bracket 10 is bifurcated centrally at 13 to receive the lower end of a connecting link generally indicated by the reference 14, the lower end of the link being pivoted to the bracket by means of a horizontal pivot pin or rivet 15.

The link 14 is adapted to swing around the pivot pin 15 as indicated by the dot and dash lines 16 in Fig. 2 and the link is formed in two co-linearly arranged parts 17 and 18, one of them being a male part and having a screw-threaded spigot screwing into the other part which constitutes the female part. In the arrangement illustrated the part 18 constitutes the male part, and it will be seen that it has a screw-threaded spigot 19 which screws into an internally screw-threaded longitudinally arranged bore 20 in the part 17 of the link. This arrangement enables the effective length of the link 14 to be adjusted as will be readily apparent, such adjustment being required for adjusting the toggle fastener to suit the particular relatively movable parts to which the fastener is applied. Further reference will be made to this link adjustment hereinafter.

A double-ended locking lever generally indicated by the reference 21 is pivoted, intermediate its ends, to the male part 18 of the link 14, this pivotal connection being effected through the medium of a pivot pin or rivet 22 parallel to the hereinbefore mentioned pivot pin or rivet 15, and passing through the male part 18 of the link and also into a pair of parallel side cheeks 23 projecting rearwardly from the front of the lever 21 at right angles to the pivot pin 22. The locking lever is thus pivotal about the pivot pin or rivet 22 relatively to the link 14, the front of the locking lever being cut away at 24 to permit the lever this freedom of movement.

The two arms of the locking lever 21 are of unequal length, the longer arm 25 constituting the operating end or finger piece of the lever and the other arm 26 being formed by portions of the said side cheeks 23 which are each furnished at their ends with fulcrum means comprising a part circular recess 27 imparting a hooked form to this end of the lever which is adapted for engagement with a pair of arcuate fulcrum members or plates 28, there being one of these plates formed on, or secured, to the inside of each of the vertical side members of the inverted U-shaped frame 3 of the secondary part of the fastener, these plates 28 being locked at the lowermost front corner of the frame 3 in laterally spaced relationship so as to receive the link 14 between them as is clearly shown in the drawings.

Figs. 1 and 2 show the fastener in its closed or locked position, but assuming that the fastener is opened and unlocked and that the link 14 and locking lever 21 are in the positions shown in broken lines in Fig. 2, the fastener is closed or locked by swinging the link 14 about the pivot 15 until the hooked ends 27 of the locking lever engage with the plates 28 within the housing or secondary part 2 of the fastener. The finger piece 25 of the locking lever 21 is now moved arcuately about the pivot 22 so that the hooked ends 27 of the side cheeks 23 of the locking lever ride around the edges of the plates 28 until the lever 21 is brought into an over-dead-centre and fully locked position. Moving the locking lever in this way draws the two parts 1 and 2 of the fastener, and the relatively separable parts to which the fastener parts are secured, closely together. A stop pin 29 extends between the vertical sides of the frame 3 of the secondary part of the fastener to limit the rearward or inward movement of the operating end 25 of the locking lever 21, this stop pin carrying a sleeve to which further reference will be made hereinafter.

When the fastener is closed or locked the lever 21 lies wholly within the frame 3 with its front surface flush with the front or outer surface of this frame, and the lever substantially closes the front or outer side of the frame or housing 3 except for a short portion thereof at the upper end of the housing or frame. The latter part of the housing or frame is closed at the front or outer side by a closure or finger piece formed by the operating end portion 30 of a latch lever generally indicated by the reference 31, this latch lever being pivoted at the end remote from the part 30 upon a pivot pin 32 mounted at its ends in the sides of the frame 3 and extending transversely across the latter at a position spaced from the front and rear edges of the frame.

The latch lever 31 is provided adjacent its pivoted end with a hooked portion or latch 33 spaced forwardly or outwardly of the pivot 32 and arranged for engagement, when the lever 21 is in the locked position shown in Figs. 1 and 2 of the drawings, with a latch pin 34 extending horizontally across the lever 21 between the side cheeks 23 thereof.

The engagement of the latch 33 with the latch pin 34 serves to secure the locking lever 21 against movement in the releasing direction and thus constitutes an auxiliary means of locking the fastener and a further safeguard against its accidental release.

The latch lever 31 is urged to its locking position by means of a compression spring 35, one end of which is seated in a recess 36 in the latch lever, and the other end of which surrounds a locating projection 37 on the back plate 4 of the secondary part of the fastener. The outward or forward movement of the latch lever 31 is limited by the sleeve on the stop pin 29 previously referred to.

When the latch lever 31 is in its locking position the operating end or finger piece 30 of this lever will lie flush with the outer edges of the frame 3 and with the colinearly arranged locking lever 21, and constitutes a push-button by which the latch lever may be pushed inwardly or rearwardly to release the locking lever when desired. The operating end 30 of the latch lever also serves, when the latch lever is in its normal or locking position, to shield the free extremity of the finger piece 25 of the locking lever against accidental actuation of the locking lever by the engagement of a garment or other objects inadvertently with the tip thereof.

In order that the finger piece of the locking lever 21 may be made more readily accessible and operable when the locking lever has been released by the latch lever 31, this invention provides for the automatic projection of the operating end 25 of the lever 21 forwardly out of the frame 3 on the depression or rearward movement of the latch lever finger piece 30. In the arrangement illustrated in Figs. 1 to 3 this forward projection of the locking lever is effected through the medium of a throw-out element generally indicated by the reference 38, this element comprising a pair of similar rockable bell crank throwout levers 39 pivoted upon the hereinbefore mentioned stop pin 29 and spaced apart by a sleeve 29' and which may be integral therewith. The two arms 40 and 41 of each throwout lever 39 extend from the stop pin 29 at right angles thereto with their front and upper edges inclined with respect to one another, at an angle, in the case illustrated, of about 215 degrees.

Each of the two throw-out levers 39 is arranged immediately adjacent the inner surface of one of the vertical sides of the frame 3 as is very clearly shown in Fig. 1 of the drawings, and the latch lever 31 is cut away along each of its longitudinal edges to form a slot terminated by ends 42 to accommodate the throw-out levers 39, and the arrangement is such that the arm 40 of each of these levers extends inwardly or rearwardly so that its tip lies behind a shoulder 43 at the upper end of the latch lever adjacent to finger piece 30 as is clearly seen in Figs. 1 to 3.

The throw-out levers 39 are so arranged in relation to the locking lever 21 and the latch lever 31 that as the latch lever is pushed inwardly or rearwardly it does not cause the throw-out levers 39 to operate on the locking lever 21 until the latch pin 34 has been released by the latch 33; immediately this release has been effected the rearwardly movable arms 40 of the throw-out levers 39 will cause the other arms 41 of these levers to project the locking lever forwardly somewhat as illustrated in Fig. 3 of the drawings.

The throw-out levers 39 may each be provided with a third rearwardly or inwardly directed medial limb or arm 44 serving to limit the extent to which the arms 41 of the levers 39 can swing forwardly, the arms 44 of the throw-out levers 39 being adapted to engage against suitable flanges of the back-plate 4 to stop the continued forward movement of the arms 41 of the throw-out levers. The arms 44 could also be arranged to co-operate with the latch lever 30 so that the latter automatically returns the throw-out levers to their normal position (their Fig. 2 position) after operation and on relieving part 30 of the latch lever from rearward or inward pressure.

A variety of alternative methods of locking the adjustable two-part link 14 of the toggle after adjustment may be employed, but preferably one of the methods shown in Figs. 1 to 4 or 5 and 6 is employed.

In the arrangement shown in Figs. 1 to 4 the screw threaded spigot 19 is provided with a flat 45 along one side thereof, and this flat is adapted to co-operate with a rotary locking pin 46 extending transversely through the female part 17 of the link 14 at right angles to the axis of the screw threaded spigot 19, and so that periphery of the locking pin lies against the flat on this screw threaded spigot and so prevents the latter from rotation in the link part 17.

At one end the locking pin 46 is provided with a head 47 or other means by which the pin may be rotated in the link part 17 whilst being restrained against axial movement in this part, and in one side the said locking pin is furnished with a part cylindrical cut-out or gap 48, the arrangement being that when the pin is in the position shown at Fig. 4 the spigot 19 cannot be rotated in the link part 17 but is released for such rotation and adjustment when the locking pin 46 is rotated through 180 degrees to bring its gap 48, the radius of curvature of which corresponds with the radius of curvature of the spigot 19, into register with the screw threaded bore 20 of the link part 17. It will thus be seen that by this simple locking means the two parts of the link 14 can be secured against relative rotation and yet freely released for longitudinal adjustment in steps of one or more thread-pitches at a time.

In the alternative arrangement shown in Figs. 5 and 6 the threaded spigot 19' is formed separately of the link part 18' and is in the form of a headed bolt, the shank 49 of which passes through a bore 50 in this link part. Moreover, the head 51 of this bolt is peripherally toothed or serrated as shown at 52 for co-operation with a releasable locking pin or spring catch 53 by which the bolt can be locked in any of its angularly adjusted positions. It will be appreciated that by this arrangement the longitudinal adjustment of the link can, if desired, be a fraction of the pitch of the threads of the bolt and need not be equal to a whole pitch or a multiple of such a pitch.

In the arrangement shown in Figs. 5 and 6, the method of pivoting the link part 18' to the locking lever 21 is also modified to accommodate the shank 49 of the said bolt. Thus, as clearly shown in Fig. 6, the link part 18' is mounted on stub trunnions 54 at the inner ends of grub screws 55 screwed into the side cheeks 23 of the locking lever.

Figs. 7 to 9 illustrate a further embodiment of this invention which in principle is the same as that illustrated in Figs. 1 to 3 but in which the toggle fastener is made mainly from sheet metal and the latching and throw-out arrangements are somewhat modified. As the construction and operation of the fastener will, in the main, be obvious from the foregoing description, only the essential differences between this modified arrangement and that already described will now be pointed out.

Thus in the embodiment of Figs. 7 to 9, the locking lever 21' is pivoted at 22' to an internal bridge piece 56 on which is anchored a self-locking nut 57 free to rotate relatively to the bridge piece but restrained against axial movement with respect thereto, this lock nut being mounted on a screw-threaded bolt 58 constituting the adjustable link of the fastener and partly shrouded in an outer link 59 having rearwardly or inwardly extending lugs 60 at its lower end and through which passes the pivot pin 15' for the link and having at its upper end a further rearwardly projecting lug 60' through which the eye bolt 58 freely passes. Thus rotation of the nut 57 adjusts the locking lever 21' with respect to the pivot 15' and the primary part 1' of the fastener.

The hooked ends 27' of the locking lever 21' are adapted to co-operate with fulcrum members comprising pins 28' secured in the sides 3' of the sheet metal secondary part 2' of the fastener, and the latching of the locking lever in its closed position is effected by the engagement of a latch part 34' of the locking lever 21' with a latch nose 33' on the latch lever 31' which is pivoted in the secondary part of the fastener by means of a pivot pin 32', the latch lever 31' being urged to its normal and latching position by means of a hairpin or torsion spring 35' on the pivot pin 32'.

In this case the throw-out element or means is incorporated in the latch lever itself instead of being separate therefrom and is constituted by transverse lugs or throw-out arms 61 projecting inwardly from extensions 62 of the side cheeks 63 of the latch lever 31', the extensions 62 being on the opposite side of the latch-lever pivot 32' to the finger piece 30' of the latch lever.

The transverse throw-out lugs 61 are adapted, during the inward or rearward movement of the finger piece 30' of the latch lever 31' and after the latch nose 33' has disengaged the co-operating latch part 34' of the locking lever, to engage a pair of transverse co-operating lugs 63 on the locking lever and thereby to project the released locking lever forwardly or upwardly on the continued inward or rearward movement of the finger piece 30', this state of affairs being shown clearly in Fig. 9.

I claim:

1. A toggle fastener comprising a primary part and a secondary part formed respectively for attachment to two relatively separable members to be connected by the fastener; a locking lever having, at one end, a finger piece and, at its other end, fulcrum means; a link pivoted at one end between the ends of said locking lever and pivoted at its other end to the said primary part of the fastener; fulcrum members on said secondary part of the fastener for engagement with the fulcrum means of said locking lever during the closing of the fastener; a latch lever pivotally carried by said secondary part of the fastener and adapted releasably to secure said locking lever in its locked position; and throw-out means operable by said latch lever, during the locking lever-releasing movement of the latter, to effect an initial movement of the locking lever in an unlocking direction.

2. A toggle fastener according to claim 1, wherein the said throw-out means comprise at least one rockable element interposed between the said latch lever and said locking lever, said rockable element being adapted to be rocked by the said latch lever at the end of the releasing movement of the latter and to effect the said initial unlocking movement of the locking lever.

3. A toggle fastener according to claim 2, wherein the said rockable element comprises at least one lever having at least two arms and pivoted to said secondary part of the fastener, one arm of said lever being disposed for engagement with the said latch lever during the latter part of the movement of this lever in the locking lever-releasing direction and the other arms of said rockable element being adapted to engage the finger piece of the locking lever so as to effect the said initial unlocking movement thereof on the rockable element being actuated by said latch lever.

4. A toggle fastener according to claim 3, wherein the said rockable element comprises a bell-crank lever, one arm of which is adapted for engagement by said latch lever and the other arm of which is adapted to engage the said locking lever to effect the initial unlocking movement thereof.

5. A toggle fastener according to claim 4, having a pair of the said bell-crank levers, one at each side of the said latch lever, said latch lever being adapted to act simultaneously on both these bell crank levers which similarly act simultaneously upon the said locking lever at laterally spaced positions.

6. A toggle fastener according to claim 5, wherein means are provided to limit the movement of the said bell-crank levers in the direction for effecting the initial unlocking movement of the locking lever.

7. A toggle fastened according to claim 1, wherein the said throw-out means comprise a throw-out arm provided rigidly on said latch lever and extending from the pivot of such lever in the opposite direction to the remainder of the lever, such throw-out arm being adapted to engage the said locking lever to effect the initial movement thereof in the unlocking direction at the latter part of the movement of the latch lever in the locking lever-releasing direction.

8. A toggle fastener comprising a primary part and a hollow secondary part respectively adapted for attachment to two relatively separable members to be connected by the fastener; a locking lever having two arms one of which serves for operating the lever and the free end of the other arm of which constitutes fulcrum means; a link pivoted at one end to the said primary part of the fastener and pivoted at its other end between the operating arm and fulcrum means of the said locking lever; fulcrum members at the end of said hollow secondary part of the fastener which is nearer to the primary part of the latter in use, such fulcrum members being adapted for engagement by the fulcrum means of the said locking lever during the closing of the fastener; a latch lever pivoted to the said secondary part of the fastener; a latch on said latch lever; a latch engaging part on the said locking lever positioned to be engaged by said latch when the locking lever is in its fully closed position; spring means urging said latch lever forwardly to its latching position; a finger piece on said latch lever adapted, when the fastener parts are in their fastener-closed positions, to lie substantially flush with the front of the said hollow secondary part and the operating arm of the said locking lever; and throw-out means in said hollow secondary part of the fastener for initiating the unlocking movement of the said locking lever and to project the operating end of the latter beyond the front of said secondary part of the fastener when such lever has been released by the said latch lever; said throw-out means being adapted for operation by the said latch lever during movement of this lever in a locking lever-releasing direction and said throw-out means being adapted to act upon said locking lever when so operated.

9. A toggle fastener according to claim 8, wherein the said throw-out means comprise a pair of bell-crank levers pivoted to said hollow secondary part of the fastener and arranged one on each side of the said latch lever, one arm of each of said bell-crank levers being located behind the finger piece of the said latch lever for rearward movement by the latch lever when the said finger piece thereof is moved rearwardly to release the locking lever, and the other arm of each said bell-crank lever being adapted to engage the rear surface of the operating arm of the said locking lever and to push the latter arm forwardly out of said hollow secondary part of the fastener when the first named arm of the bell-crank lever is moved rearwardly by the latch lever as aforesaid.

10. A toggle fastener according to claim 9, having a stop arm on each said bell-crank lever adapted to co-operate with a part of said hollow secondary part of the fastener, thereby to limit the movement of the bell-crank lever in the throw-out direction.

11. A toggle fastener according to claim 8, wherein the said locking lever has a latch pin at its rear and the said latch lever has a latch nose for engagement with the said latch pin when the locking and latch levers are in their closed positions.

12. A toggle fastener according to claim 8, wherein the effective length of the said link carrying the locking lever is adjustable.

13. A toggle fastener according to claim 8, wherein the said link comprises two parts, a male and a female part screwed together, and means for releasably locking said parts against relative rotation.

14. A toggle fastener according to claim 13, wherein the means for locking the said link parts against relative rotation comprise a rotatable gapped locking pin in the female part of the link and adapted in one position to co-operate with a flat on the screw of the male part of the link to lock the link parts against relative rotation but to free these parts for such rotation when said locking pin is turned to bring its gap adjacent the said screw.

15. A toggle fastener according to claim 8, wherein the said link comprises two parts secured in axially adjustable end to end relationship by a peripherally serrated-headed bolt passing freely through one of said link parts and screwing into the other such part, rotation of said bolt effecting further separation of the link parts or drawing of these parts together according to the direction of such rotation; and retaining means on the link part next to the head of said bolt and adapted for selective retaining engagement with said serrations on the periphery of the head of said bolt, thereby releasably to lock the latter against rotation with respect to said retaining means provided link part.

16. A toggle fastener according to claim 8, wherein the said link comprises an eye-bolt pivoted to the said primary part of the fastener; a bridge piece pivoted to said operating lever between the operating and fulcrum arms of the latter; a self-locking nut carried by said bridge piece, said nut being screwed on said eye-bolt and rotatable with respect to said bridge piece but axially immovable with respect to the latter.

17. A toggle fastener according to claim 8, wherein the said throw-out means comprise an extension arm on the said latch lever and disposed on the opposite side of such lever to the said finger piece thereof, said extension arm being adapted for engagement with the said locking lever operating arm on the inside thereof to initiate the unlocking movement of this locking lever as the latch lever completes its movement in the locking lever-releasing direction.

JOHN LOVE.

References Cited in the file of this patent

UNITED STATES PATENTS

| Number | Name | Date |
| --- | --- | --- |
| 346,575 | Bailey | Aug. 3, 1886 |
| 1,462,286 | Jepson | July 17, 1923 |
| 1,596,710 | Binks | Aug. 17, 1926 |